UNITED STATES PATENT OFFICE.

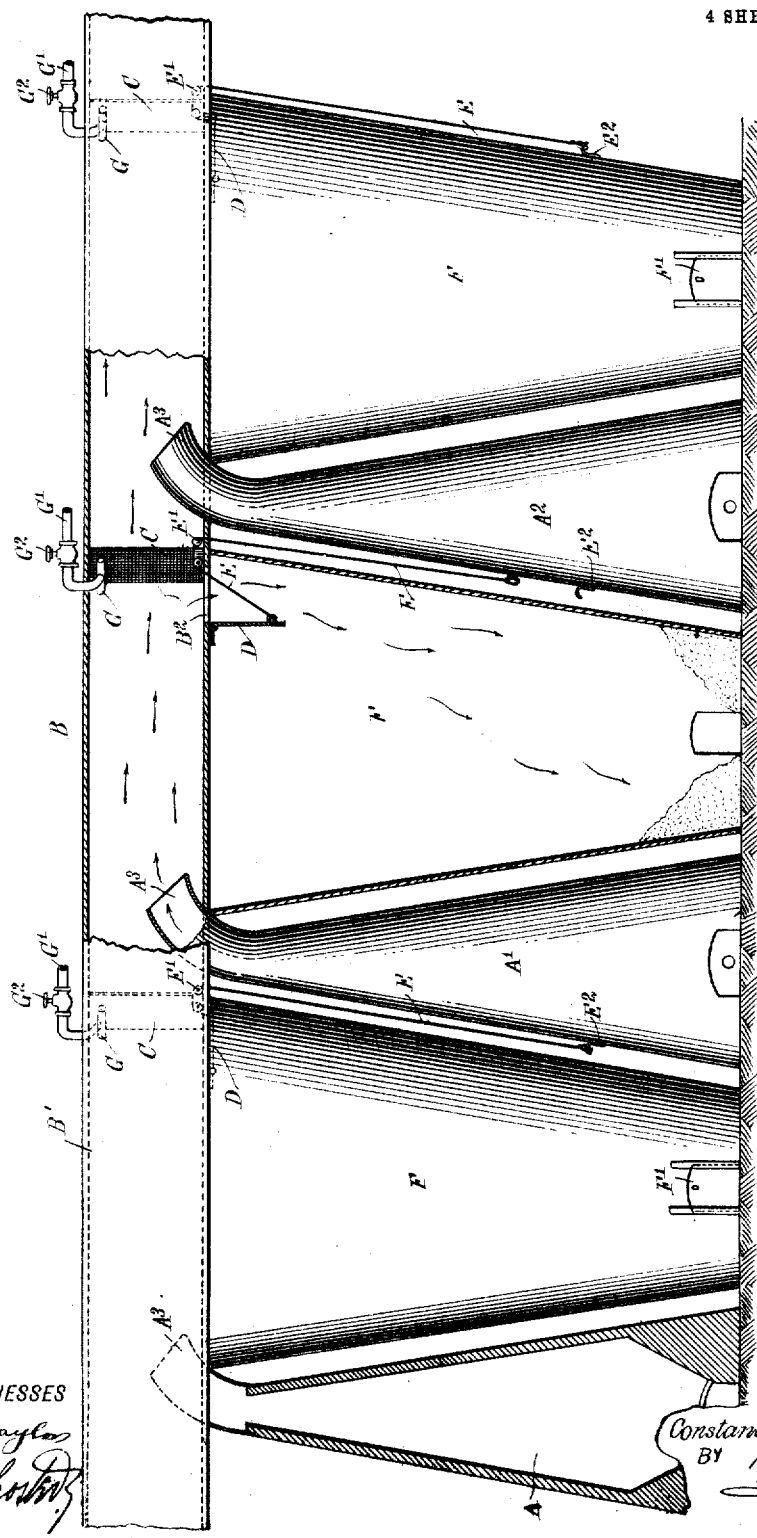

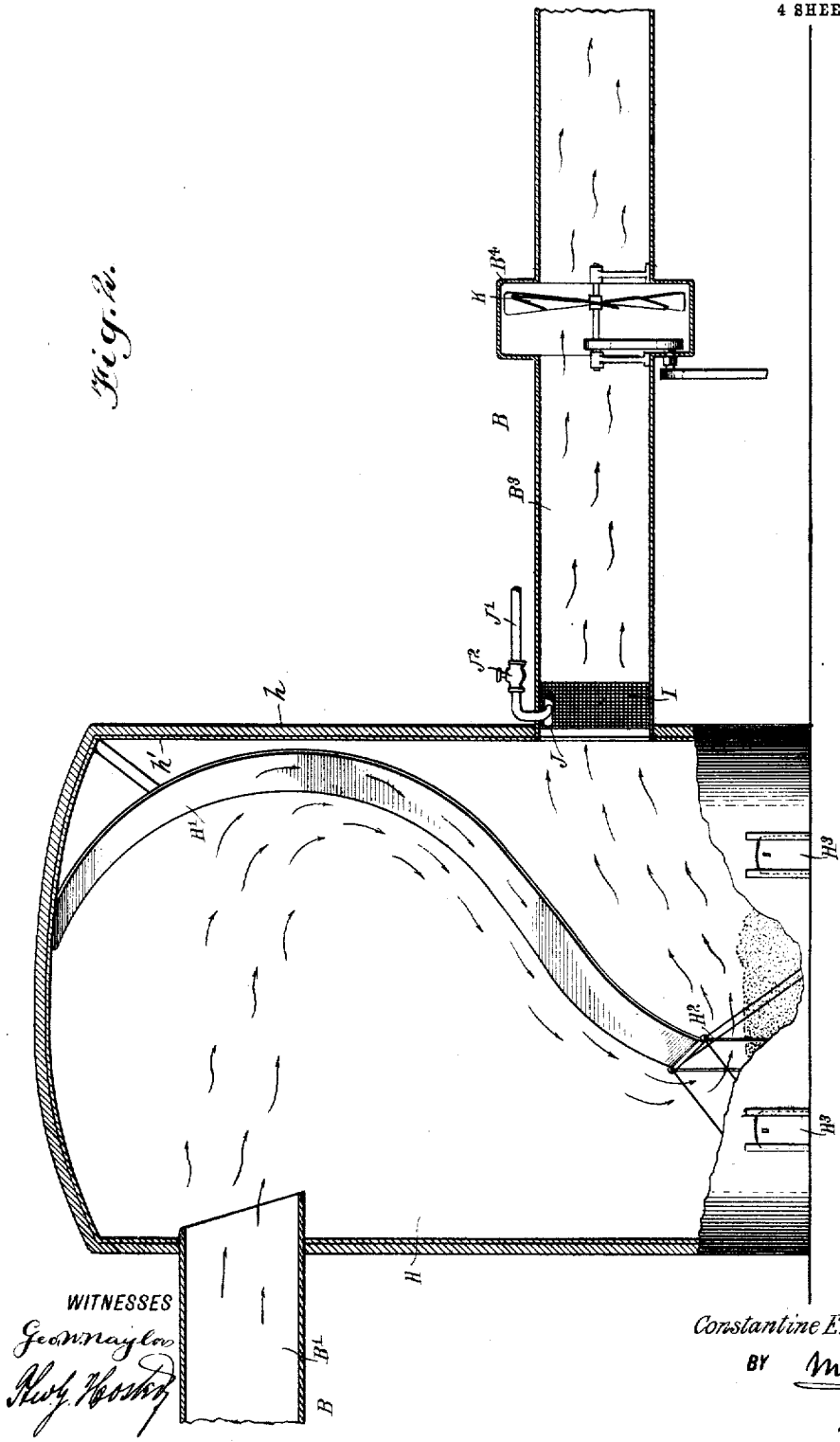

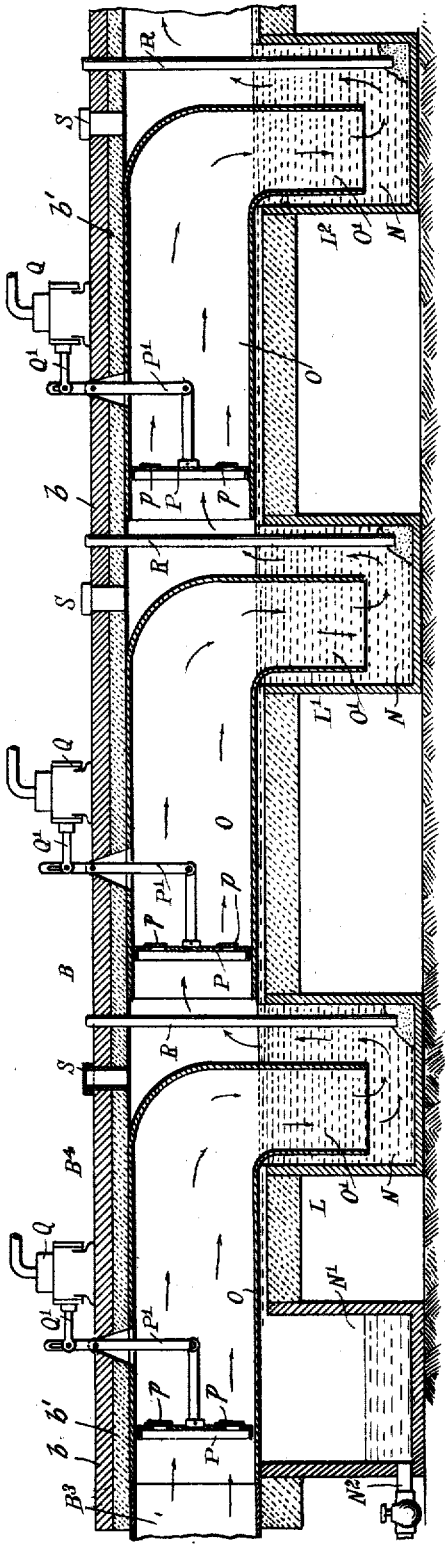

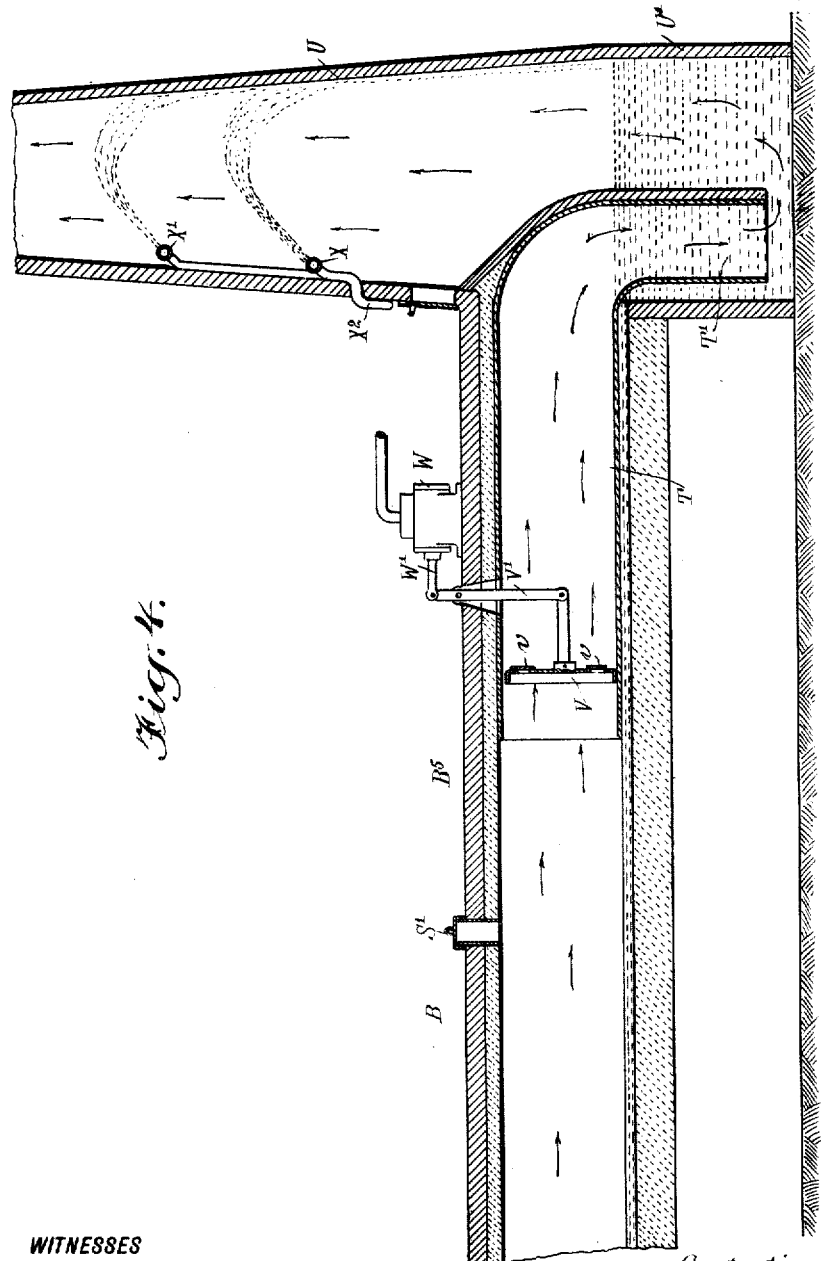

CONSTANTINE E. M. TAMBACOPOLO, OF NEW YORK, N. Y.

CONDENSER FOR SMELTER-FURNACE FUMES.

1,023,600.   Specification of Letters Patent.   Patented Apr. 16, 1912.

Application filed October 26, 1910. Serial No. 589,140.

*To all whom it may concern:*

Be it known that I, CONSTANTINE E. M. TAMBACOPOLO, a subject of the King of Greece, and a resident of the city of New York, borough of Manhattan, in the county and State of New York, have invented a new and Improved Condenser for Smelter-Furnace Fumes, of which the following is a full, clear, and exact description.

The object of the invention is to provide a new and improved condenser for smelter furnace fumes, arranged to insure precipitation of the solid particles and condensation of the metallic and other vapors contained in the smelter fumes with a view to prevent the obnoxious gases from passing into the atmosphere, at the same time saving the valuable matter of the fumes.

For the purpose mentioned, use is made of a conduit, extending from one or a series of smelter furnaces to a stack, the conduit containing successive deflecting means for deflecting the heavy and coarse solid particles contained in the fumes, a separator for separating the lighter and finer particles of the fumes, and one, or a plurality of washing and precipitating devices containing a suitable liquid for washing the fumes and precipitating the valuable matter contained in the fumes.

A practical embodiment of the invention is represented in the accompanying drawings forming a part of this specification, in which similar characters of reference indicate corresponding parts in all the views.

Figures 1, 2, 3 and 4 are views of successive portions or sections of the condenser for smelter fumes, Fig. 1 being particularly a side elevation, partly in section, of the beginning end of the condenser connected with a series of furnaces, Fig. 2 being a sectional side elevation of the separator, Fig. 3 a like view of the washing and precipitating portion, and Fig. 4 the terminal or stack portion of the condenser.

As illustrated in Fig. 1, a series of smelter furnaces A, A' and A², preferably of conical form, discharge their fumes arising from the smelting operations into the beginning end of a section B' of a conduit B by providing the upper ends of the smelter furnaces A, A' and A² with curved outlets A³, open forwardly into the section B'. In the section B' of the conduit B and located between the adjacent outlets A³ is arranged a screen C for precipitating the heavy coarse particles contained in the fumes passing forward in the conduit B in the direction of the arrows, as plainly shown in Fig. 1. In the bottom of the section B', immediately in the rear of a screen C, is formed an opening B² normally closed by a hinged trap door D connected with a chain E extending over guide pulleys E' to the outside, to be under the control of an operator for opening or closing the trap door D. Each chain E is adapted to be fastened to a suitable hook E² for holding the trap door D in a closed position. Each opening B² opens into an inverted conical receptacle F arranged between adjacent furnaces, for receiving the heavy and coarse particles deflected by the screen C onto the bottom of the section B', that is, at the opening B² of the trap door D, to allow of discharging the accumulated particles into the receptacle F on the operator opening the door D periodically (see Fig. 1).

In order to keep the screen C clean, use is made of jets of steam discharged from a jet pipe G located in the rear of the screen C and connected with a pipe G' extending to the outside of the conduit B and leading to a suitable source of steam supply. The supply pipe G' is provided with a suitable valve G² for regulating the amount of steam to be sprayed by the pipe G onto the screen C. As indicated in Fig. 1, the screen C and the jet pipe G are preferably arranged obliquely in the section B' of the conduit B to insure proper deflecting of the solid particles without hindering the flow of the fumes through the screens. The receptacles F are provided with suitable doors F' for periodically cleaning the receptacles of the accumulated contents.

The section B' of the conduit B terminates in the casing H of a separator provided with a deflecting partition H' extending from the top of the casing H to within a short distance of the bottom of the casing, the lower end of the partition H' being fastened to a suitable support H². The casing H is preferably of brick $h$ with concrete lining $h'$. As shown in Fig. 2, the partition H' is curved in such a manner that the incoming fumes strike the upper portion of the partition H' and are directed by the same downward and rearward, to finally pass under the lower end of the partition H' and into the section B³ of the conduit B, and which section B³ opens into the casing H a distance above the lower end of the partition H'. Now by the fumes coming in contact with the partition H' and being whirled around by the same, as indicated by the arrows in Fig. 2, any solid particles contained in the fumes and striking the partition H' are caused to slide down the partition to finally drop into the bottom of the separator H and accumulate therein. The casing H is provided with suitable doors H³ for gaining access to the interior of the casing with a view to remove the accumulated contents from time to time.

In the entrance end of the section B³ of the conduit B is arranged an obliquely-disposed screen I to deflect any solid particles that may still be contained in the fumes and which solid particles drop down into the casing H. The spraying jet J discharges steam onto the screen I to keep the same clean, the jet pipe J being connected with a supply pipe J' having a valve J² and similar to the pipe G' previously mentioned. The section B³ of the conduit B is provided with an enlargement B⁴ containing a suction fan K for drawing the fumes out of the casing H into the section B³ to propel the fumes forward in this section, as indicated by the arrows in Fig. 2. The suction fan K is driven by a suitable mechanism from a motor, arranged outside of the conduit B. The section B³ of the conduit B connects with the section B⁴ provided with a number of washing and precipitating devices L, L' and L², arranged one in front of the other, and all alike in construction, so that further description of the same is not deemed necessary. Each washing and precipitating device is provided with a well N, into which extends the depending terminal or angular portion O' of a cylinder O fitted within the section B⁴ of the conduit B, and which section is preferably of brick $b$ with concrete lining $b'$, as indicated in Fig. 3. The well N is filled with water or other liquid, and the depending portion O' terminates a distance below the level of the liquid, as plainly indicated in Fig. 3. In the cylinder O is mounted to reciprocate a plunger P provided with valves $p$ and connected by a lever P' with the piston rod Q' of an engine or other motor Q employed for imparting reciprocating motion to the valve plunger P. Thus when the plunger P moves forward the fumes in front of the plunger are forced through the depending member O' into the liquid contained in the well N, to pass through the liquid in an upward direction, to be finally drawn into the cylinder O of the next following washing and precipitating device, as will be readily understood by reference to Fig. 3. Into each well N extends a supply pipe R, reaching with its upper end beyond the top of the conduit B, to permit of discharging the suitable chemical into the well N to cause a precipitation of the metallic or other vapors that may be contained in the fumes, it being understood that the chemical used is selected according to the nature of the fumes treated at the time.

The section B⁴ of the conduit B is provided in the top with manholes S above the wells N, to permit of gaining access to the interior of the section B⁴ for repairs and other purposes. The section B⁴ of the conduit B terminates in the end sections B⁵ shown in Fig. 4, and containing a cylinder T having a depending angular member T' extending into a liquid contained in the base U' of a stack U. In the cylinder T reciprocates a valve pump plunger V connected by a lever V' with the piston rod W' of an engine or other motor W employed for reciprocating the plunger V in the cylinder T, with a view to force the fumes through the member T' into the liquid contained in the base U' of the stack U, the fumes in rising through the liquid passing up in the stack U to encounter the jets of water emanating from jet pipes X, X', arranged in the stack U above the entrance of the conduit B into the stack U by way of the cylinder T and the member T'. The pipes X, X' are located preferably one above the other and are connected by a pipe X² with a suitable source of water supply. It is understood that by the water emanating from the pipes X, X' the fumes are condensed and other valuable material contained in the same is precipitated and settles in the base U' of the stack T. A manhole S' is arranged in the section B⁵ similar to the manholes S above mentioned.

As indicated in Figs. 3 and 4, the several wells N as well as the well formed by the base U' are in communication with each other and connected with a well or sump tank N', so that the washing liquid has a level which reaches approximately up to the under side of the cylinders O and the washing liquid finally flows into the well N' from which the liquid can be withdrawn for further treatment to recover valuable materials.

The operation is as follows: When the condenser is in use and the several motors Q and W and the exhaust fan K are running, then the fumes passing from the furnaces A, A' and A² into the conduit B are forced forward, and the fumes in their forward travel first encounter the screens C which deflect the heavier and coarser particles, and the fumes in the separator casing H are deprived of their lighter particles, and the fumes are subjected to a series of washings in the liquid contained in the wells N and the base U' of the stack U, so that the fumes finally leaving the stack U are free of obnoxious gases.

It will also be noticed that by subjecting the fumes to the action of the deflecting and washing and precipitating devices all valuable matter contained in the fumes is saved.

Having thus described my invention, I claim as new and desire to secure by Letters Patent:

1. A condenser for smelter fumes, comprising a conduit for the passage of the smelter fumes, a separating chamber interposed in the conduit and having a curved partition extending from the top of the chamber to within a short distance of the bottom of the chamber, the inlet end of the conduit opening into the chamber near the top thereof at one side and the outlet end of the conduit leading from the opposite side of the chamber above the lower end of the said partition, a screen in the said outlet end of the conduit adjacent to the chamber, and a suction fan in the conduit in advance of the said screen.

2. A condenser for smelter fumes, comprising a conduit for the passage of the smelter fumes, a separating chamber interposed in the conduit and having a curved partition extending from the top of the chamber to within a short distance of the bottom of the chamber, the inlet end of the conduit opening into the chamber near the top thereof at one side and the outlet end of the conduit leading from the opposite side of the chamber above the lower end of the said partition, a screen in the said outlet end of the conduit adjacent to the chamber, a spraying pipe in the conduit for spraying steam on the said screen, and a suction fan in the conduit in advance of the said screen.

3. A condenser for smelter fumes, comprising a conduit and a series of washing and precipitating devices arranged in the conduit, one in front of the other, each washing and precipitating device having a well for containing a washing and precipitating liquid, a cylinder fitting into the said conduit and having a depending member extending into the well and terminating below the level of the liquid in the well, a valved plunger in the said cylinder adjacent to the end opposite that having the depending member, power means exterior of the conduit, and a connection between the said power means and the said plunger for actuating the latter.

4. A condenser for smelter fumes, comprising a conduit and a series of washing and precipitating devices arranged in the conduit one in front of the other, each washing and precipitating device having a well for containing a washing and precipitating liquid, a cylinder fitting into the said conduit and having a depending member extending into the well and terminating below the level of the liquid in the well, the entrance of a cylinder being connected with the well of a preceding washing and precipitating device, a valved plunger in the entrance end of the said cylinder, power means exterior of the conduit, and a connection between the said power means and the said plunger for actuating the latter.

5. A condenser for smelter fumes, comprising a conduit, a stack for containing in its base a washing liquid, a cylinder fitting the conduit adjacent the stack and having a depending member extending into the stack and terminating below the level of the liquid in the stack, a reciprocating valved plunger in the entrance end of the said cylinder, and spraying devices within the said stack above the level of the liquid in the base of the stack.

6. The combination with a smelter furnace, of a conduit into which the furnace discharges, an enlarged chamber interposed in the conduit, having its inlet in one side near the top and its exit in the opposite side near the bottom, said chamber being provided with a curved partition at the side opposite the inlet, said partition extending from the top toward the inlet side of the chamber and terminating a short distance from the bottom and below the exit of said chamber, a screen in the conduit beyond the chamber and adjacent to the exit of said chamber, and a suction fan in the conduit in front of said screen.

7. In a condenser for smelter fumes, a conduit having a plurality of openings in its bottom and a transverse screen adjacent to each opening, a plurality of conical furnaces arranged below the conduit and each discharging into the conduit adjacent to a screen at the side opposite that of the opening, an inverted conical receptacle arranged between adjacent furnaces for receiving the heavy and coarse particles deflected by the said screen, and a door for controlling each opening of the conduit.

8. In a condenser for smelter fumes, a conduit having a plurality of openings in its bottom and a transverse screen adjacent to each opening, a plurality of furnaces arranged below the conduits and each having a forwardly curved outlet extending into the conduit adjacent to a screen at the side opposite that of the opening, a receptacle arranged between adjacent furnaces for receiving the heavy and coarse particles deflected by the screen and a door controlling each opening of the conduit.

In testimony whereof I have signed my name to this specification in the presence of two subscribing witnesses.

CONSTANTINE E. M. TAMBACOPOLO.

Witnesses:
THEO. G. HOSTER,
PHILIP D. ROLLHAUS.

Copies of this patent may be obtained for five cents each, by addressing the "Commissioner of Patents, Washington, D. C."